US012136504B2

(12) United States Patent
Corona

(10) Patent No.: US 12,136,504 B2
(45) Date of Patent: Nov. 5, 2024

(54) MOISTURE RESISTANT SEAL FOR ELECTRICAL CABLE ASSEMBLIES

(71) Applicant: DSM&T COMPANY INC., Fontana, CA (US)

(72) Inventor: Sergio Corona, Fontana, CA (US)

(73) Assignee: DSM&T Company Inc., Fontana, CA (US)

( * ) Notice: Subject to any disclaimer, the term of this patent is extended or adjusted under 35 U.S.C. 154(b) by 0 days.

(21) Appl. No.: 18/366,869

(22) Filed: Aug. 8, 2023

(65) Prior Publication Data

US 2023/0377771 A1 Nov. 23, 2023

Related U.S. Application Data

(63) Continuation of application No. 17/737,476, filed on May 5, 2022, now Pat. No. 11,769,609.

(51) Int. Cl.
*H01B 7/285* (2006.01)

(52) U.S. Cl.
CPC .................................... *H01B 7/285* (2013.01)

(58) Field of Classification Search
CPC ...... H02G 3/088; H02G 15/113; H01B 7/285; H01B 7/2813; H01B 7/282
See application file for complete search history.

(56) References Cited

U.S. PATENT DOCUMENTS

| | | | | | |
|---|---|---|---|---|---|
| 4,018,979 | A * | 4/1977 | Young | H02G 15/113 | 439/906 |
| 4,461,736 | A * | 7/1984 | Takagi | H02G 1/145 | 156/48 |
| 5,536,904 | A * | 7/1996 | Kojima | H01B 13/322 | 174/76 |
| 6,303,865 | B1 * | 10/2001 | Yamamoto | H01R 4/70 | 174/72 A |
| 2002/0062975 | A1 * | 5/2002 | Matsunaga | B60R 16/0207 | 174/72 A |
| 2006/0183382 | A1 * | 8/2006 | King | H01R 4/70 | 439/798 |
| 2010/0122827 | A1 * | 5/2010 | Pullium, III | H02G 15/003 | 174/59 |
| 2010/0212936 | A1 * | 8/2010 | Arai | H01B 7/285 | 29/857 |
| 2011/0045697 | A1 * | 2/2011 | Sawamura | B60R 16/0207 | 427/117 |
| 2014/0299353 | A1 * | 10/2014 | Saito | H01B 7/282 | 29/868 |
| 2015/0279516 | A1 * | 10/2015 | Wakabayashi | H01B 7/282 | 174/77 R |

(Continued)

*Primary Examiner* — Hoa C Nguyen
*Assistant Examiner* — Amol H Patel
(74) *Attorney, Agent, or Firm* — Ruggiero McAllister & McMahon LLC

(57) ABSTRACT

A waterproof seal for electrical assemblies wherein an outer sheath of an electrical cable is removed to expose the wires and the insulation is removed from the wires to form a window of exposed electrical conductor, the electrical conductors being maintain apart from each other and contained in a cover that may comprise a connector, an epoxy applied to the electrical conductors to fill in all the space in and around the electrical conductors and the cover to form a waterproof seal that prevents water from wicking past the waterproof seal via an interior of the electrical cable.

19 Claims, 14 Drawing Sheets

(56) References Cited

U.S. PATENT DOCUMENTS

| | | | | |
|---|---|---|---|---|
| 2018/0166185 | A1* | 6/2018 | Fleischer ............... | H01B 7/282 |
| 2021/0057128 | A1 | 2/2021 | Takata et al. | |
| 2022/0282009 | A1 | 9/2022 | Nambara et al. | |

* cited by examiner

MOISTURE RESISTANT SEAL FOR ELECTRICAL CABLE ASSEMBLIES

FIELD OF THE INVENTION

The present invention relates to a waterproof seal for electrical conductors. The system prevents the wicking of water through an electrical power cable through the space in and around the electrical conductor and surrounded by the electrical insulator due to thermal heating and cooling of a sealed light fixture.

BACKGROUND OF THE INVENTION

One challenge faced in the electrical lighting industry is the prevention of water intrusion into lighting fixtures. This is especially an issue for light fixtures designed to be in wet locations such as exterior lighting, areas with standing water or marine applications. Lighting manufacturers go to great lengths to design weather tight enclosures to prevent water intrusion and various methods have been tried with limited success.

Many problems can arise when water gets into a light fixture. One major problem is corrosion that can shorten the life of the light fixture. Other issues relate to safety, such as short-circuits and ground-faults, that can occur as the light fixture degrades. Still other issues include reduced performance as the light fixture progressively degrades.

To deal with these issues, lighting manufacturers have sought to provide better moisture seals to completely seal off the interior space of the light fixture from the outside. While lighting manufacturers have been successful in producing very tightly sealed light fixtures, this has still not prevented water incursion from an unlikely source, namely, through the electrical conductors themselves.

In some types of fixtures (e.g., landscape lighting, flood lighting and so on), the lamps used in these types of light fixtures can generate a significant amount of heat. When heat is generated by the lamp it functions to heat the surrounding air inside the sealed light fixture, which in turn causes the air to expand. However, in these light fixtures with very tight seals, the heated air is able to easily escape the interior of the fixture and therefore the expanding air increases the air pressure inside the fixture. The pressurized air inside the light fixture then seeks equilibrium with the lower pressure air outside the fixture using any pathway available. One pathway that has not been widely recognized is the air space inside the electrical cables (the space between the electrical conductor strands and space between the electrical conductors and the surrounding insulation. The result has been that air inside the fixture passes through the electrical cable and escapes the interior of the light fixture through the electrical fittings. However, while escaping air is not necessarily problematic, when the light fixture is turned off and the lamp inside cools down, the air inside the light fixture also cools down and contracts causing a negative pressure to develop inside the light fixture. The negative pressure functions to draw air and moisture into the light fixture through the same path that air escaped, namely, via the electrical cable and fittings. Over time, the repeated cycles of heating and cooling can cause a significant amount of moisture to be drawn into the light fixture. This moisture in turn, is subject to the heating and cooling when the light fixture turns on/off, which leads to condensation throughout the light fixture leading to accelerated corrosion, degradation, and eventual premature failure of the light fixture.

Another trend in the lighting industry is reduction in the size of light fixtures and their associated components. Space can be very important in certain lighting applications, such as, marine lighting, accent and decorative lighting, and vehicle lighting. These types of lighting applications often also require sealed light fixtures to prevent the intrusion of water into the various small light fixtures. However, methods and systems for sealing electrical cables and components often involve the use of bulky O-rings and other types of seals that are just too large for low profile applications.

SUMMARY OF THE INVENTION

It is desired then is a system and method that prevents water from entering a light fixture via the electrical cable that provides power to a light fixture.

It is also desired is a system and method of sealing an electrical cable without causing any degradation to the current-carrying capacity of the cable such that the cable must be de-rated.

It is further desired is a system and method that prevents water from traveling through an electrical cable that does not significantly increase the diameter of the cable or that can be integrated into a low-profile fitting that can be used with a sealed light fixture.

It is still further desired is a system and method that prevents water from traveling through an electrical cable and integrated into a small and light weight modular fitting.

It is also desired to provide a system and method that incorporates a waterproof seal into an articulating structure that allows for protection of the electrical cable and prevents water from traveling along the electrical cable contained therein and passing into a light fixture to which the electrical cable is connected.

In one configuration a system is provided that includes and electrical cable having three electrical wires (hot, neutral, ground) running therethrough, where each electrical wire comprises an inner electrical conductor that is surrounded by an insulation. The outer jacket of the electrical cable can be removed for a portion of the axial length of the cable to expose the three electrical wires. The insulation can then be removed from a portion of the axial length of one of the electrical wires to form a first window of exposed electrical conductor. The electrical conductor may comprise a plurality of twisted copper conductors, which could be untwisted in the first window to form straightened conductors. These straightened conductors can then be solidified using solder or ultrasonic welding for form a single unitary conductor for at least a portion of the window. This same process could be repeated for the other two electrical wires such that all three wires have a solidified electrical conductor within a window where the insulation of the electrical wire has been removed.

In one configuration, the windows that are formed exposing the electrical conductor for each electrical wire can be axially offset from one another so that the exposed electrical conductors are essentially prevented from accidentally coming into contact with each other. In another configuration, each window could be axially offset from each other such that there is no axial overlap of the windows. In still another configuration, the windows could be essentially axially aligned with each other. In this case, a spacer can be provided that comprises an electrical insulator and the electrical conductors are maintained at a set radial distance from each other via the spacer. In one case, the spacer could maintain the electrical conductors at radial angles of 120 degrees relative to each other and maintain a present radial distance between the electrical conductors.

Once the electrical conductors have been solidified a covering can be positioned around the electrical cable in the area where the windows have been created. In one configuration the covering can comprise a shrink wrap material that have an axial length that is slightly longer than the axial length of the three windows. Once the covering is slipped over the electrical cable, one side of the covering can be heat shrunk over top of the outer jacket of the electrical cable. At this point an epoxy can be applied over top of and into the windows. The covering may be supplied with a bonding agent applied to an inside surface of the covering to ensure the epoxy that contacts the inside surface of the covering securely bonds to the covering. Finally, the remaining portion of the covering can be heat shrunk to completely cover all the windows. When completed, the covering will be heat shrunk over top of a first side of the outer jacket, will extend from that first side over the windows with the epoxy filling all the space between the covering and the electrical conductors, and will extend over top of the outer jacket to a second side of the windows opposite to the first side.

The above-described configuration can function without any type of spacer if the windows are axially staggered relative to each other. In this way, when the insulation is stripped away from the electrical conductor, there is no chance for one electrical conductor to accidentally touch or come in contact with any of the other electrical conductors. In one configuration, all that is needed is for the windows to be slightly axially shifted relative to the others and may even allow for axial overlap of windows. In other configurations, the windows are axially shifted to ensure no overlap occurs. When the windows are axially shifted from each other, in practice this means the moisture-blocking structure will extend for about one inch (approx. 2.54 cm) in length.

For applications where it is desirable to provide a moisture-blocking structure with an axially minimized length, an alternative is to provide the windows axially aligned with each other to limit the total axial length of the combined windows to the length of one window. However, due to the possibility of the electrical conductors physically contacting each other (or being close enough to arc), a spacer must be used to maintain a radial distance between the electrical conductors to prevent a short-circuit. In the case where a spacer is used, the moisture-blocking structure will extend for about 0.38 inches (approx. 0.97 cm) in length. This will allow for a very compact structure for use with a small fitting for a light fixture in areas where space is limited.

As described above, the electrical seal may in some instances, be positioned where a cable is attached to a connector. Additionally, the outer jacket may comprise a thermoplastic material that prevents moisture from penetrating into the electrical cable and the connector body to which the electrical cable may be connected.

For this application the following terms and definitions shall apply:

The terms “first” and “second” are used to distinguish one element, set, data, object or thing from another, and are not used to designate relative position or arrangement in time.

The terms “coupled”, “coupled to”, “coupled with”, “connected”, “connected to”, and “connected with” as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration a waterproof seal for an electrical assembly is provided comprising an electrical cable having a first conductor comprising a plurality of twisted strands covered with a first insulation, the first conductor having a first length and having first and second ends, and a second conductor comprising a plurality of twisted strands covered with a second insulation, the second conductor comprising a second length and having first and second ends. The first conductor is provided such that the insulation is stripped away from the first conductor at a first location along a longitudinal length of the first conductor to form a first window of exposed twisted strands, and the twisted strands are untwisted for at least a portion of the first window and at least a portion of the untwisted strands in the first window are solidified into a first unitary conductive portion within the first window. The second conductor is provided such that the insulation is stripped away from the second conductor at a second location along a longitudinal length of the second conductor to form a second window of exposed twisted strands, and the twisted strands are untwisted for at least a portion of the second window, and at least a portion of the untwisted strands in the second window are solidified into a second unitary conductive portion within the second window. The electrical cable also has a covering positioned around the first and second windows and an epoxy material is disposed in the first and second windows and fills any spaces between the covering and the first and second unitary conductive portions. The electrical cable is further provided with a bonding agent overlaying a portion of an inside surface of the covering such that the epoxy bonds to the inside surface of the covering. The waterproof seal is provided such that the covering prevents moisture from penetrating into the electrical cable, and the epoxy material occupy spaces within the first and second windows to prevent water from wicking through the electrical cable.

In another configuration a method for providing a waterproof seal for electrical assemblies is provided comprising an electrical cable having a first and a second conductor each having a plurality of twisted strands and each surrounded by a first and a second insulation respectively. The method comprises the steps of stripping away the insulation of the first conductor at a first location along a longitudinal length of the first conductor to form a first window of exposed twisted strands without cutting the twisted strands, untwisting the twisted strands of the first conductor in the first window, and solidifying at least a portion of the untwisted strands in the first window to form a first unitary conductive portion within the first window. The method further comprises the steps of stripping away the insulation of the second conductor at a second location along a longitudinal length of the second conductor to form a second window of exposed twisted strands without cutting the twisted strands, untwisting the twisted strands of the second conductor in the second window, and solidifying at least a portion of the untwisted strands in the second window to form a second unitary conductive portion within the second window. The method also comprises the steps of positioning a covering around the first and second windows, applying an epoxy material to the first and second windows and filling in any spaces between the covering and the first and second unitary conductive portions, and overlaying a bonding agent on a portion of an inside surface of the covering such that the epoxy bonds to the inside surface of the covering. The waterproof seal is provided such that the covering prevents moisture from penetrating into the electrical cable, and the epoxy material occupies spaces within the first and second windows to prevent water from wicking through the electrical cable.

In still another configuration a method for providing a waterproof seal for electrical assemblies is provided comprising an electrical cable having a first and a second conductor each surrounded by a first and a second insulation respectively, the method comprising the steps of: stripping away the insulation of the first conductor at a first location along a longitudinal length of the first conductor to form a first window of exposed electrical conductor without cutting the electrical conductor and stripping away the insulation of the second conductor at a second location along a longitudinal length of the second conductor to form a second window of exposed electrical conductor without cutting the electrical conductor. The method further comprises the steps of positioning a covering around the first and second windows, applying an epoxy material to the first and second windows and filling in any spaces between the covering and the first and second exposed electrical conductors, and overlaying a bonding agent on a portion of an inside surface of the covering such that the epoxy bonds to the inside surface of the covering. The waterproof seal is provided such that the covering prevents moisture from penetrating into the electrical cable, and wherein the epoxy material occupies spaces within the first and second windows to prevent water from wicking through the electrical cable.

Other objects of the invention and its features and advantages will become more apparent from consideration of the following drawings and accompanying detailed description.

DETAILED DESCRIPTION OF THE INVENTION

Figure 1:
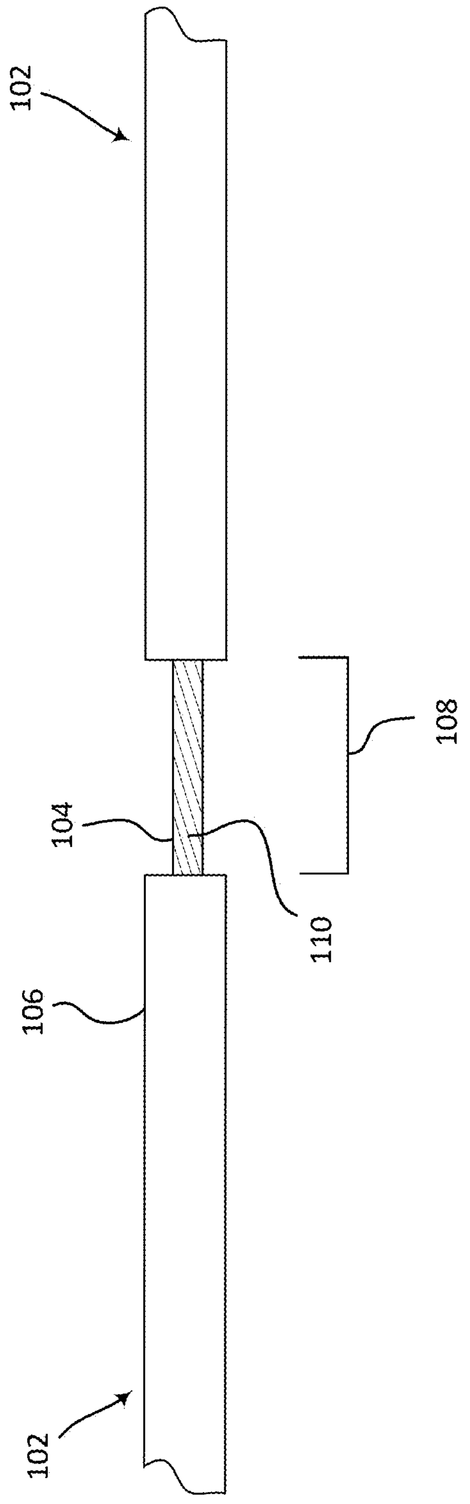
FIG. 1 is an illustration of an electrical cable with the insulation removed to expose the electrical conductor according to an initial step of the invention.

Referring now to the drawings, wherein like reference numerals designate corresponding structure throughout the views.

FIG. 1 depicts and illustration of an electrical cable 102 that can be used with the moisture seal according to one embodiment of the invention. The electrical cable 102 comprises an electrical conductor 104 surrounded by an insulation 106. The electrical conductor 104 can be made of any suitable material but will typically comprise copper or aluminum.

In FIG. 1 a portion of the insulation 106 is stripped away from the electrical cable 102 to expose the electrical conductor 104 and forming a window 108 of exposed electrical conductor. Care must be taken to not cut or damage the electrical conductor during this process. The exposed electrical conductor is formed of a plurality of twisted strands 110 that form the overall electrical conductor 104.

Figure 1A:
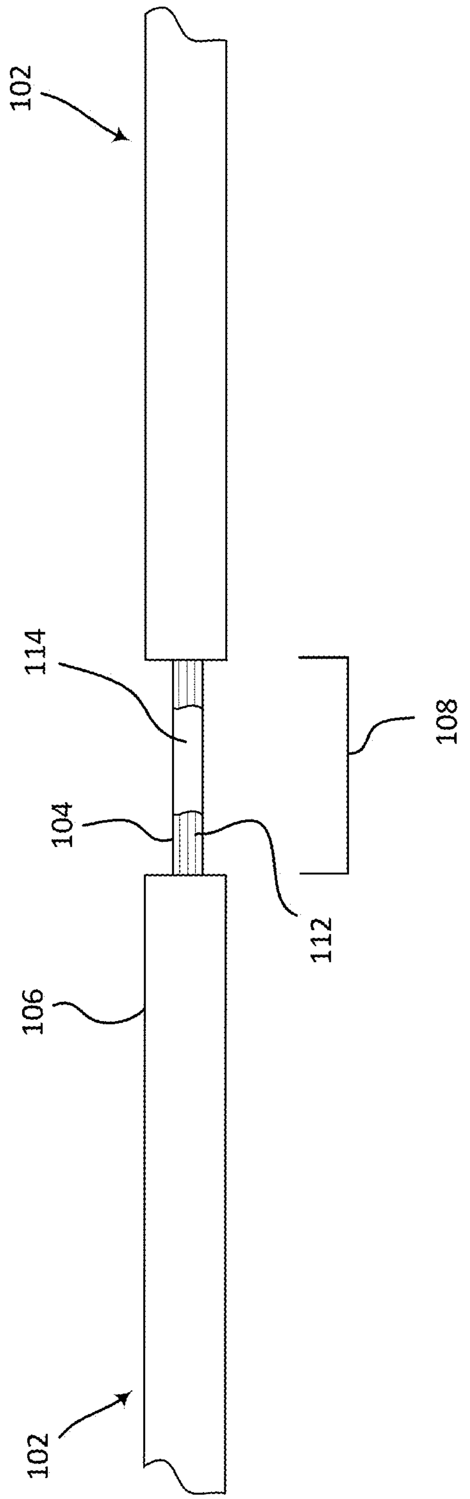
FIG. 1A is an illustration of the electrical conductor untwisted and a portion of the plurality of strands formed into a unitary conductive portion according to another step of the invention.

Referring now to FIG. 1A, it can be seen that the twisted strands have been untwisted to form a plurality of relatively straight strands 112. Also illustrated is a unitary conductive portion 114 that is positioned within the window 108.

The unitary conductive portion 114 may be formed by either applying solder to the relatively straight strands 112 or by ultrasonic welding the relatively straight strands 112. It will be understood by those of skill in the art that ultrasonic welding utilizes acoustic vibrations that are applied to the plurality of strands that will be held together under pressure to create a solid-state weld. When solder is utilized, any suitable well-known solder can be used such as, a tin-silver-copper (Sn—Ag—Cu, or SAC) solder.

It should be noted that the twisted strands are straightened, which more easily allows for the formation of the unitary conductive portion 114, particularly in the case when the solder-method is used.

Figure 1B:
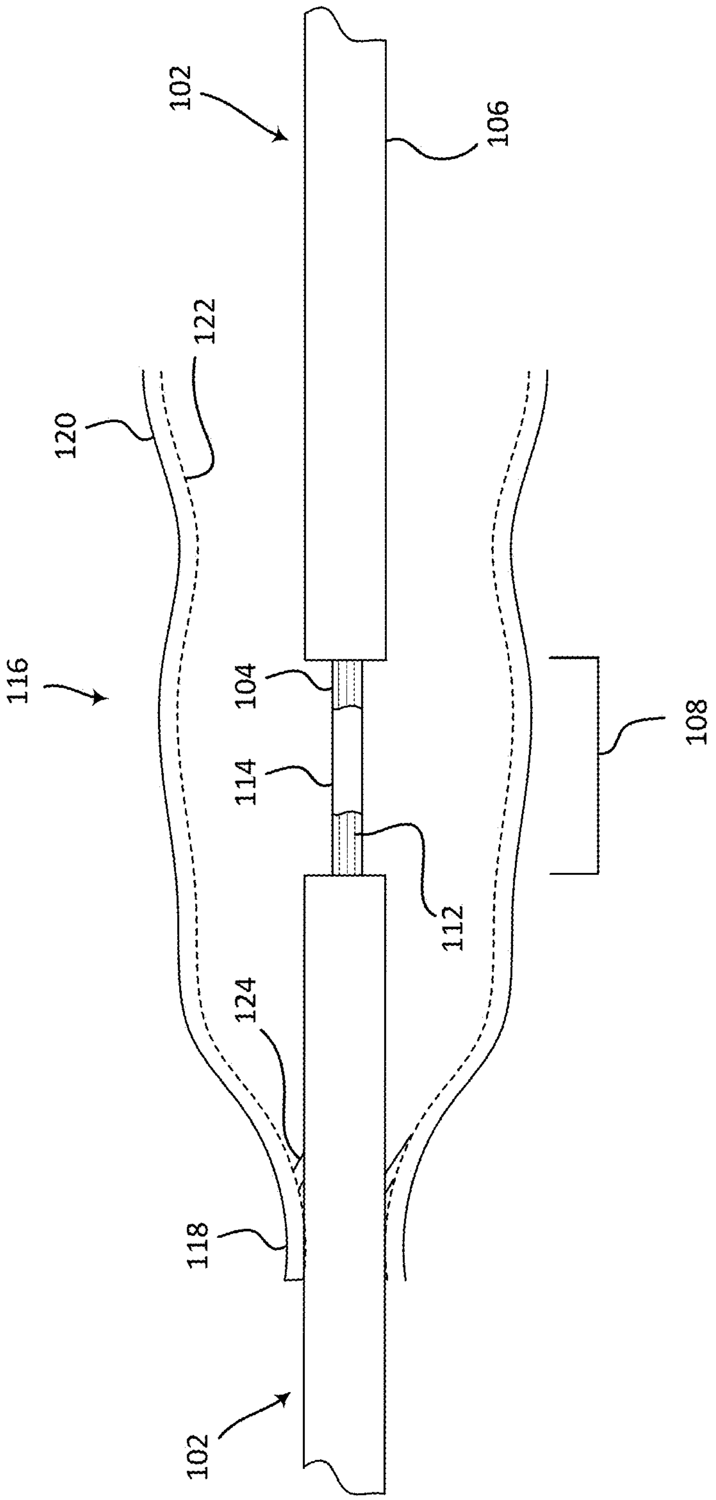
FIG. 1B is an illustration of a covering being applied over the electrical cable with an epoxy to cover the exposed electrical conductor according to another step of the invention.

Turning to FIG. 1B, a cover 116 is in the process of being applied to the electrical cable 102. The cover 116 may comprise any type of suitable material that can shrink to enclose the window 108.

In one configuration a first end 118 of the cover 116 is adhered to the electrical cable 102 while the remaining end 120 remains enlarged to allow access to the window 108. An inside surface of the cover 116 may be covered with an adhesive 122 and is designed to bond with an epoxy 124 that will be applied over top of the electrical cable 102 and in the window 108 as better seen in FIG. 1C.

The epoxy 124 may be provided as a thermoplastic or thermoset material. The epoxy 124 may further comprise a hot melt adhesive (HMA). The adhesive may be provided as, for example, a one-part or two-part epoxy cement.

Figure 12:
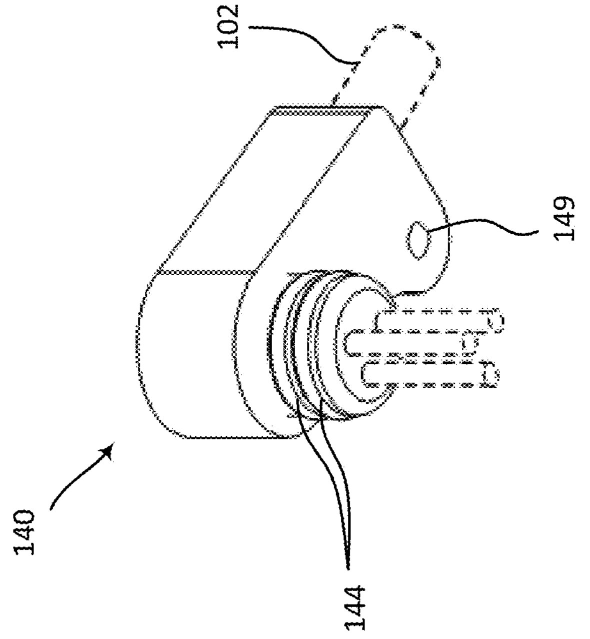
FIGS. 11-12 is an illustration of a ninety-degree connector with strain relief that incorporates the moisture seal according to FIG. 1D.
Figure 11:
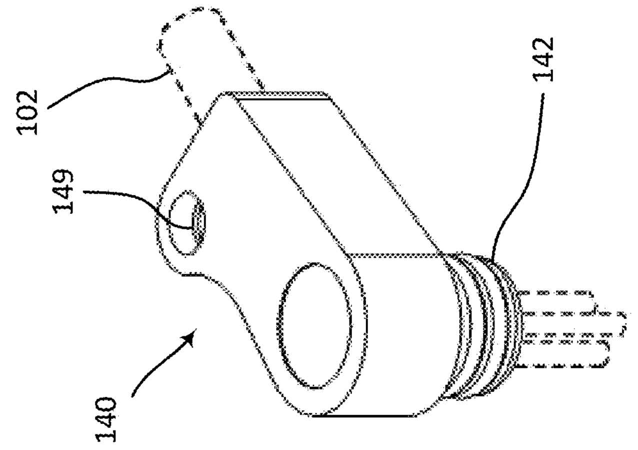
Figure 13:
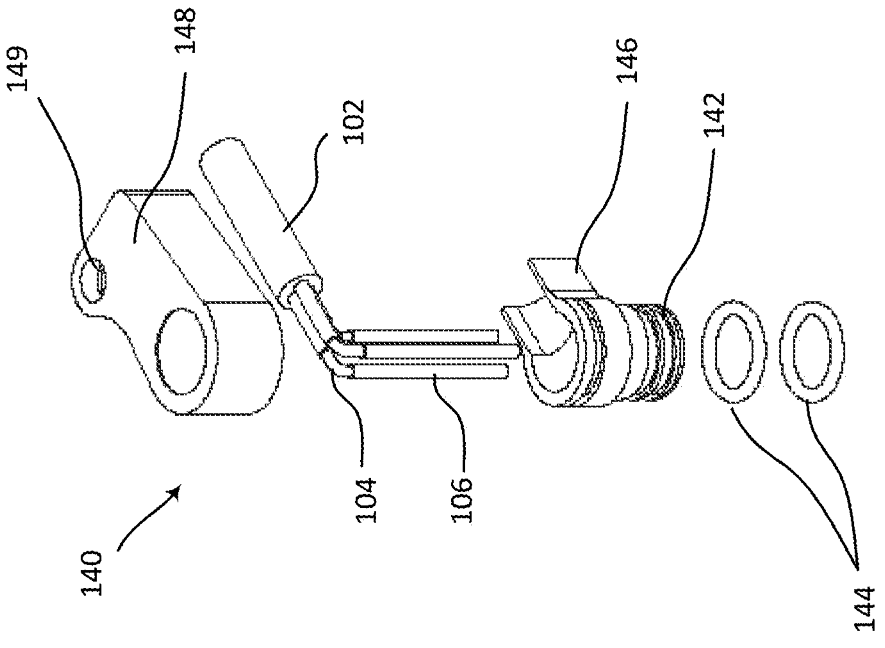
FIG. 13 is an exploded version of the ninety-degree connector with strain relief according to FIGS. 11-12.

It should be noted that the cover 116 may as shown in FIG. 1B comprise a heat shrink material or may comprise an overmold material formed as a thermoplastic material such as is depicted in FIGS. 11-13. The thermoplastic material may be polyethylene (PE), polystyrene (PS), polypropylene (PP), polyvinyl chloride (PVC), ethylene propylene diene monomer (EPDM) or Chlorobutyl Rubber.

Figure 1C:
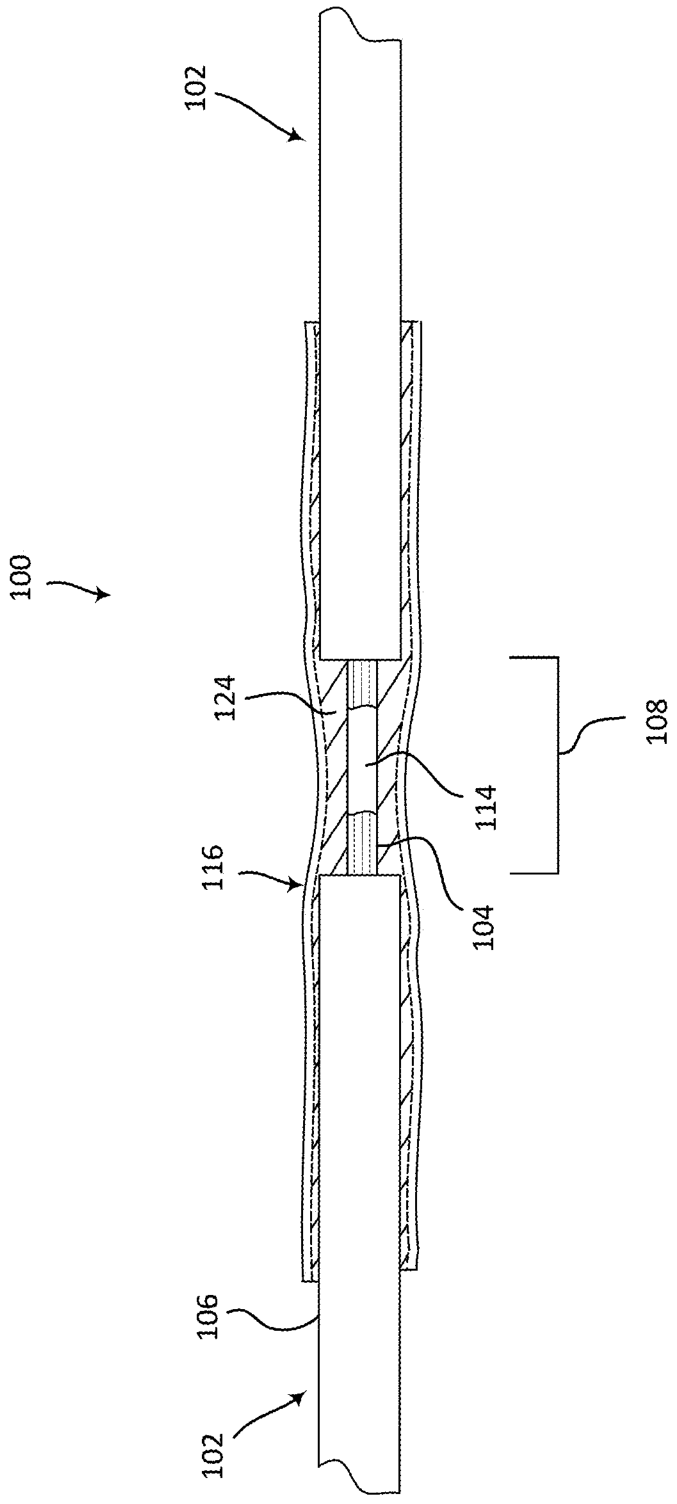
FIG. 1C is an illustration of the moisture seal according to the invention.

Referring now to FIG. 1C, the waterproof seal 100 is shown with the epoxy fully applied and the covering in place over the exterior of the electrical cable 102 and fully enclosing the window 108. As can be seen in the figure, the epoxy fully surrounds the electrical conductor 104 and fills in all of the space in window 108.

In this configuration, any water that may enter the electrical cable 102 and travel along the inside of the electrical cable 102 in the spaces located between the electrical conductor 104 and the insulation 106 will encounter a moisture barrier at the waterproof seal 100. The electrical conductor 104 comprises the unitary conductive portion 114 that is a solid mass, which would prevent any water from passing through it. That unitary conductive portion 114 is surrounded by the epoxy 124, which fills in all of the spaces in and around the window 108 preventing any moisture from passing through it. The adhesive 122 provided on the inside surface of the cover 116 is designed to bond with the epoxy 124 to prevent any water from passing between the inside surface of the cover and the outer surface of the epoxy. The result is a moisture seal that in practice, prevents water from passing through the seal and entering the light fixture. This seal even functions in very wet or submerged areas where a relatively large amount of water has gotten into the electrical cable.

Figure 1D:
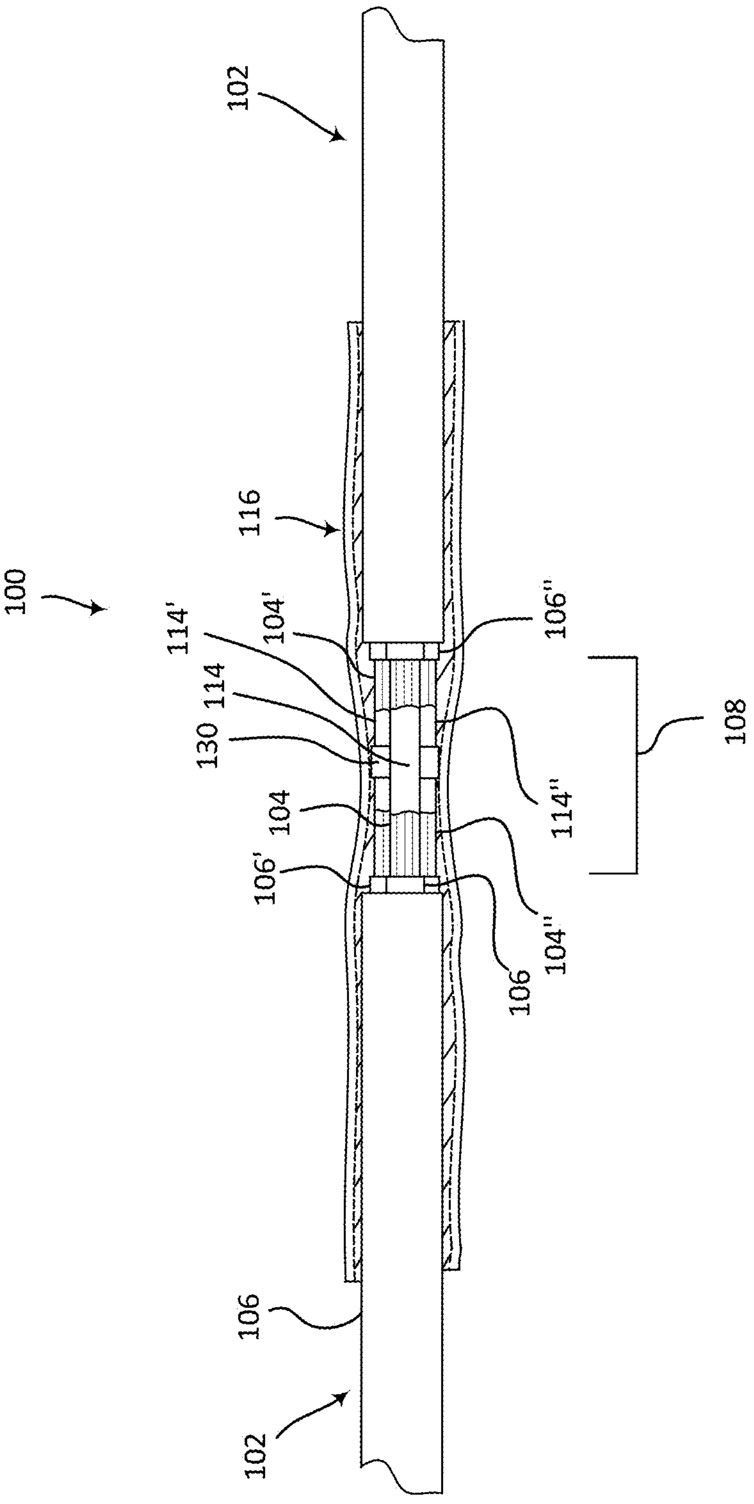
FIG. 1D is an illustration of the moisture seal according to FIG. 1 and including three electrical conductors.

While only a single electrical cable is shown in FIG. 1-1C, FIG. 1D shows and example of three electrical cables using the moisture seal 100. For example, it can be seen that electrical cables 102, 102', 102" are depicted and electrical conductors 104, 104', 104" with insulation 106, 106', 106" stripped away are shown within window 108. Each of the electrical conductors 104, 104', 104" comprise a unitary conductive portion 114, 114', 114" that is contained within the epoxy 124 and further enclosed by the cover 116.

Figure 9:
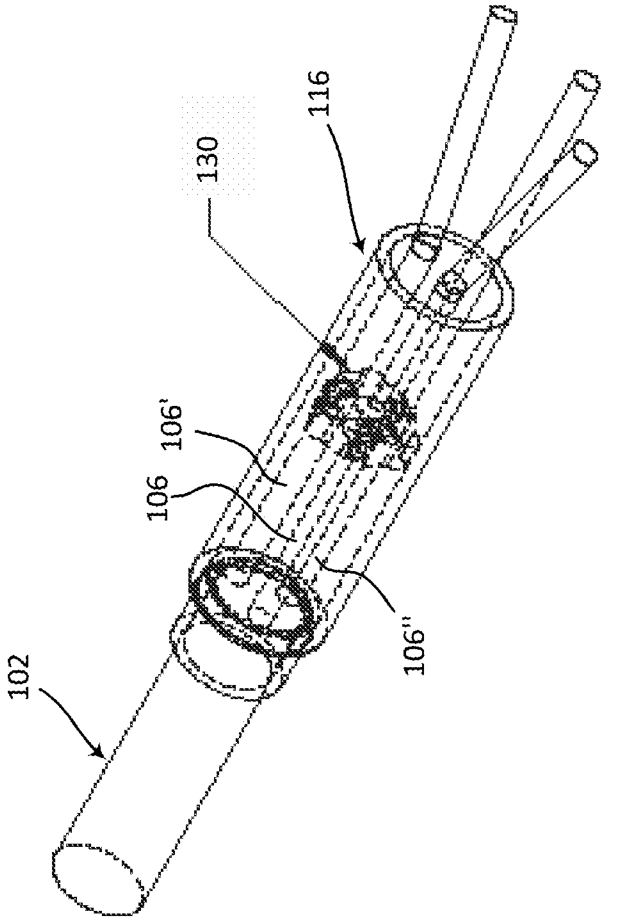
FIG. 9 is an illustration of the moisture seal according to FIG. 1D further illustrating the spacer.
Figure 10:
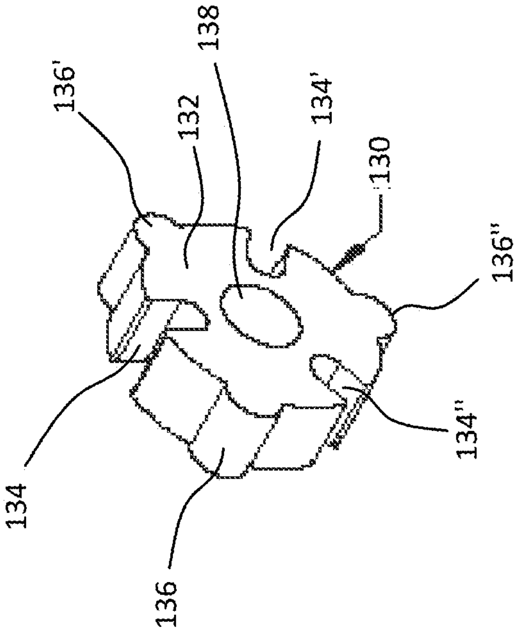
FIG. 10 is an illustration of the spacer according to FIG. 9.

Also shown in FIG. 1D is a spacer 130, which is shown in greater detail in FIGS. 9 and 10. The spacer will be discussed in connection with those figures.

As discussed in connection with FIG. 1C, the cover 116 may comprise a heat shrink material or may comprise an overmold material formed as a thermoplastic material such as is depicted in FIGS. 11-13. While three wires (power, neutral, ground) are depicted in FIG. 1C, it is contemplated that any number of wires may be used with the moisture seal where each electrical conductor would be subject to the sonic welding or soldering process and enclosed with the epoxy and cover to form the moisture seal.

Figure 2:
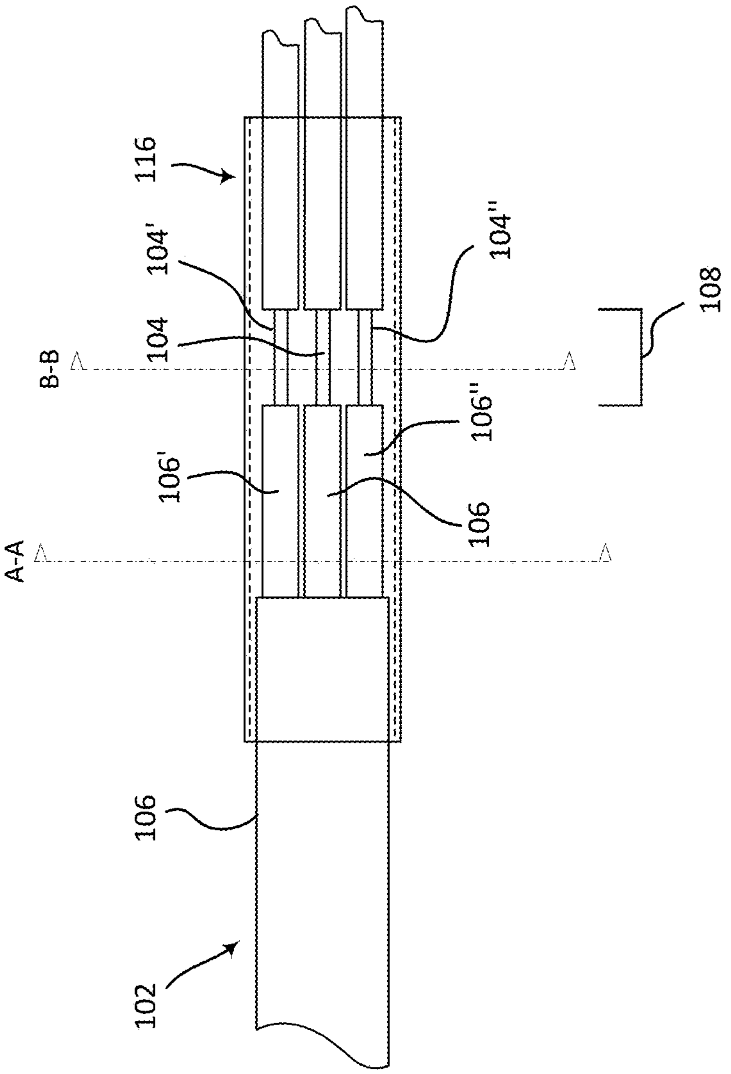
FIG. 2 is an illustration of the moisture seal according to FIG. 1D with three windows created that are axially aligned.
Figure 3:
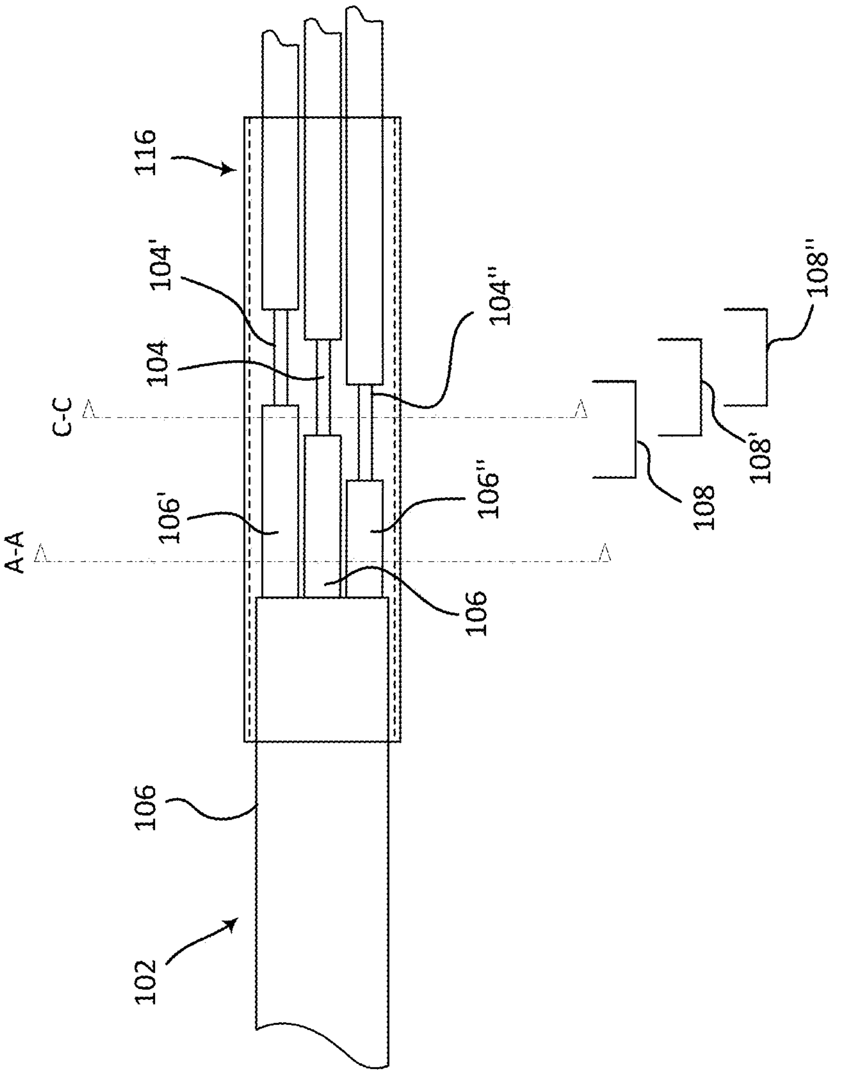
FIG. 3 is an illustration of the moisture seal according to FIG. 1D with three windows created that are slightly axially shifted relative to each other.
Figure 4:
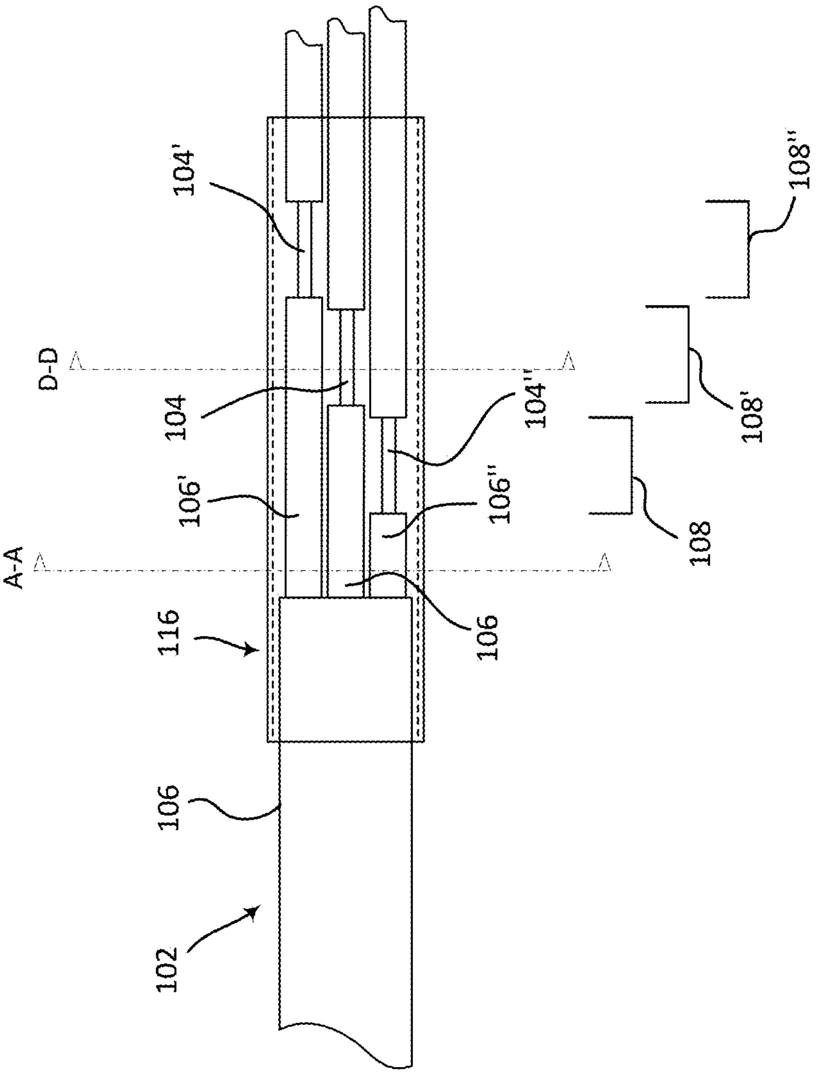
FIG. 4 is an illustration of the moisture seal according to FIG. 1D with three windows created that are axially shifted relative to each other so that there is no axial overlap between the windows.
Figure 5:
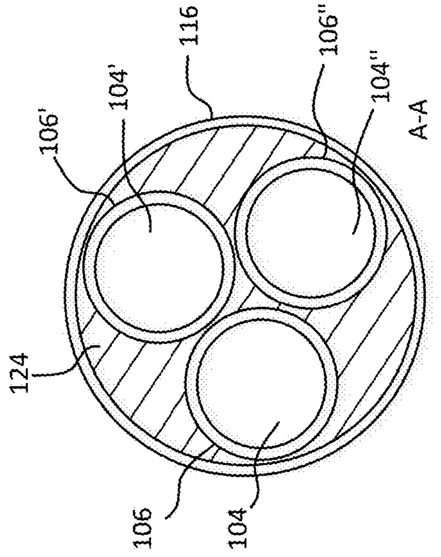
FIG. 5 is a cross section at A-A according to FIGS. 2-4.
Figure 6:
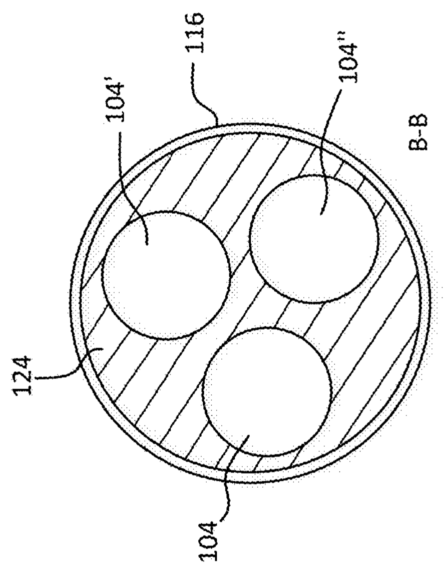
FIG. 6 is a cross section at B-B according to FIG. 2.
Figure 7:
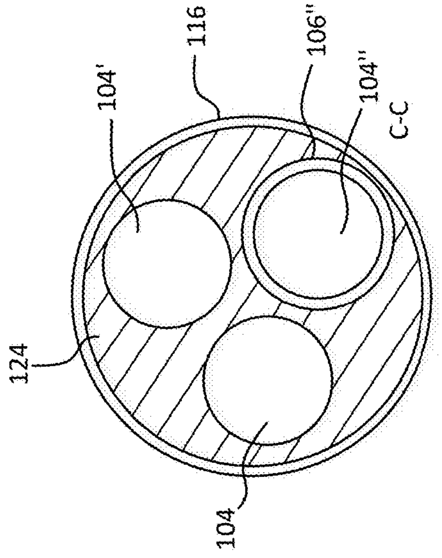
FIG. 7 is a cross section at C-C according to FIG. 3.
Figure 8:
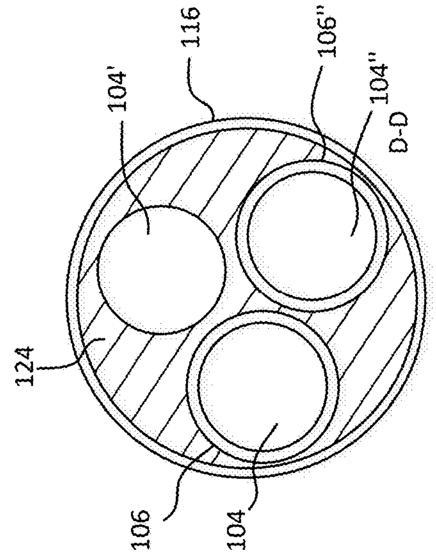
FIG. 8 is a cross section at D-D according to FIG. 4.

FIGS. 2-4 show various configurations of the configuration according to FIG. 1D. For example, electrical cables 102, 102', 102" are each shown with respective electrical conductors 104, 104', 104" having insulation 106, 106', 106" removed.

FIG. 2 shows the windows where the insulation has been removed from the underlaying electrical conductor all align axially. While the figures are not adjusted to show the overall length of the moisture seal being variable, it will be understood by those of skill in the art that the length of the moisture seal can be minimized to essentially just slightly longer than the length of one window as all of the windows align. This can result in a length for the moisture seal being as little as 0.38 inches (approx. 0.97 cm) in length.

Alternatively, if a minimized length is not required, the configuration in FIG. 3 where the windows are axially shifted from each other could be utilized. The axial shift can be seen with reference to windows 108, 108', 108". Finally, in FIG. 4, the windows are offset such that each are axially shifted to the point where none of the windows axially overlap each other, which is illustrated by windows 108, 108', 108". For the configuration in FIG. 4, the moisture seal could be approximately one inch (approx. 2.54 cm) in length.

FIGS. 5-8 show cross-sectional views of the electrical cables 102, 102', 102" at cross-sections A-A, B-B, C-C and D-D where the various cross sections of the moisture seal are shown.

Referring now to FIGS. 9-10, for applications where it is desirable to provide a moisture-blocking structure with an axially minimized length, such as shown in FIGS. 1D and 2, an alternative is to provide the windows axially aligned with each other to limit the total axial length of the combined windows to the length of one window. However, due to the possibility of the electrical conductors physically contacting each other or being so close that arcing is a danger, a spacer can be used to maintain a radial distance between the electrical conductors to prevent a short-circuit.

As can be seen in connection with FIG. 9, the axial length of the spacer 130 can approximately equal the length of the window. FIG. 10 shows the spacer 130 in greater detail. For example, the spacer includes a central portion 132 that includes a central opening 138 and cutouts 134, 134', 134" designed to receive electrical conductors 104, 104', 104" respectively. In this configuration the electrical conductors 104, 104', 104" are maintained at about a 120-degree radial position relative to each other. Also shown on spacer 130 are protrusions 136, 136', 136" that extend radially outward relative to central portion 132. The spacer 130 can be made from any type of insulating material that is known in the art and will be selected to have a good bonding factor with the epoxy 124.

FIGS. 11-13 show another configuration for the moisture seal where, instead of using a shrink cover, a connector 140 is used in the form of a ninety-degree electrical connector that can be coupled to a light fixture. In this case, the electrical cable 102 is connected to the electrical connector 140 and may include a strain relief fitting. The connector 140 is formed as a ninety-degree fitting and may include a protrusion 142 designed mechanically connect with a light fixture. In one configuration, the protrusion may be a threaded portion, while in another configuration it may comprise a friction fitting that is designed to be inserted directly into an opening. It is contemplated that the connector 140 will be provided as a liquid tight assembly and include one or more O-rings 144 that are designed to form a seal with the inside surface of an opening (not shown), such as, in a light fixture. The electrical cable 102 enters the connector 140 at a first end and exits the connector 140 from the protrusion 142. The wires can then be connected to the equipment in accordance with the manufacturer's recommendations.

As seen in FIG. 13, an exploded view of the connector 140 illustrates the electrical cable 102, the windows where the outer sheath of the electrical cable 102 is removed and the insulation 106, 106', 106" is stripped away from the electrical conductors 104, 104', 104" in order to create the moisture seal as previously discussed. The exploded view illustrates that the connector 140 is formed as two pieces including a lower portion 146 and an upper portion 148.

The lower and upper portions 146, 148 of the connector 140 may be provided as molded thermoplastic material as previously described. When the electrical cable 102 is inserted in the connector 140, the lower portion 146 and upper portion 148 sandwich the electrical cable 102 and provide strain relief. As previously discussed, an epoxy 124 may be injected into the connector 140 to surround and encase the electrical conductors 104, 104', 104", which will have been treated to form unitary conductive portions as previously discussed. It is contemplated that the inner surface of the lower and upper portions 146, 148 may be treated with the adhesive 122 to ensure that the epoxy forms a solid bond with the lower and upper portions 146, 148. The result is a very compact and rugged moisture blocking configuration that takes up minimal space.

The upper portion 148 may further be provided with a mounting hole 149 that is designed to receive a mounting element so that the connector 140 can be secured in a manner desired.

Figure 14:
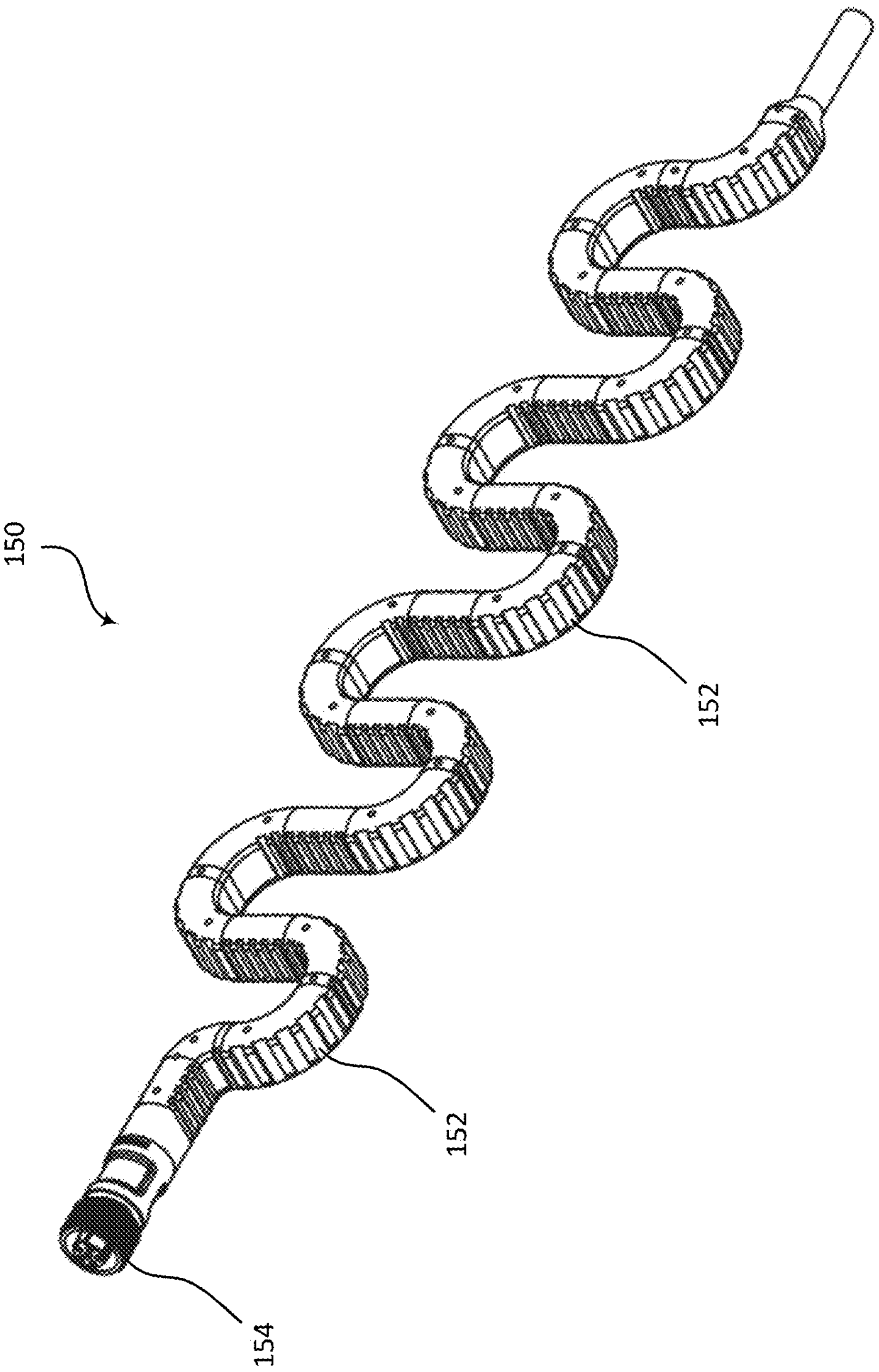
FIG. 14 is a snake assembly for a light fixture that incorporates the moisture seal according to FIG. 1D.

Referring now to FIG. 14, a snake 150 is provided that may be positioned with a cavity of a light fixture (not shown). The snake 150 may comprise any suitable plastic material as previously described that allows for protection and articulation of the power cable. The snake 150 comprises a plurality of articulating segments 152 and allow the snake to be flex and bend to a desired shape.

The electrical cable 102 is maintained inside of the snake 150 and extends to a connector 154 integral with the snake 150. While the drawing only illustrates a connector 154 on one end of the snake 150, it will be understood by those of skill in the art that a connector 154 can be provided at both ends of the snake 150, one to plug into the light fixture (not shown) and one to plug into a power connector (not shown).

The moisture seal may be provided integral with the snake on one or both ends of the snake 150 and formed in a manner consistent with that previously described. It is further contemplated that the snake 150 may be formed as a liquid tight structure.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for providing a waterproof seal for electrical assemblies comprising an electrical cable having a first and a second conductor each surrounded by a first and a second insulation respectively, the method comprising the steps of:

stripping away the insulation of the first conductor at a first location along a longitudinal length of the first conductor to form a first window of exposed electrical conductor;

stripping away the insulation of the second conductor at a second location along a longitudinal length of the second conductor to form a second window of exposed electrical conductor;

positioning the first and second windows within an enclosure;

positioning the first and second conductors in one or more spacers to maintain a distance between the first and second conductors;

applying an epoxy material to fill in space between the enclosure and the first and second exposed electrical conductors; and wherein the epoxy prevents water from wicking through the electrical cable; and the enclosure is provided as a two-part assembly with an upper portion and a lower portion.

2. The method according to claim 1, wherein the first widow is positioned in the enclosure axially offset from the second window.

3. The method according to claim 1, further comprising the step of positioning at least one O-ring on the lower portion.

4. The method according to claim 1, wherein the electrical cable further comprises a third conductor having a third length and having first and second ends, the method further comprising the steps of:

stripping away the insulation of the third conductor at a third location along a longitudinal length of the third conductor to form a third window of exposed electrical conductor;

positioning the third window within the enclosure;

applying the epoxy material to fill in space between the enclosure and the third exposed electrical conductor.

5. The method according to claim 1, wherein the first and second electrical conductors comprise twisted strands, the method further comprising the steps of:

untwisting the strands of electrical conductors for at least a portion of length of the first and second windows;

solidifying the first and second untwisted strands of the first and second electrical conductors to form a first unitary conductor portion within the first window and a second unitary conductor portion within the second window.

6. The method according to claim 1, further comprising the steps of:

sandwiching the electrical cable between the upper and lower portions to provide strain relief for the electrical cable.

7. The method according to claim 1, wherein the spacer is provided as a discrete component apart from the enclosure.

8. A waterproof enclosure for electrical assemblies for sealing an electrical cable having a first and a second conductor each surrounded by a first and a second insulation respectively, the enclosure comprising:

an upper portion and a lower portion, where said upper portion is detachably connectable to said lower portion to form the enclosure;

the first conductor having a portion of the electrical insulation surrounding the first conductor removed forming a first window, where the first window is positioned within an interior of the enclosure;

the second conductor having a portion of the electrical insulation surrounding the second conductor removed forming a second window, where the second window is positioned within an interior of the enclosure;

an epoxy material applied in and around the first and second windows in the interior of the enclosure;

wherein the first and second conductors are held in one or more spacers to maintain a distance between the first and second conductors;

wherein the epoxy prevents water from wicking through the electrical cable.

9. The waterproof enclosure according to claim 8, wherein the first window is axially offset from the second window.

10. The waterproof enclosure according to claim 8, wherein the spacer is a discrete component apart from the enclosure.

11. The waterproof enclosure according to claim 8, wherein said one or more spacers is disc-shaped and includes radial cutouts to receive the first and second conductors on an external radial surface of said spacer.

12. The waterproof enclosure according to claim 11, wherein said spacer includes a plurality of protrusions on the external radial surface of the spacer.

13. The waterproof enclosure according to claim 11, wherein said spacer includes an opening extending therethrough.

14. The waterproof enclosure according to claim 8, wherein said lower portion is formed as a ninety-degree connector.

15. The waterproof enclosure according to claim 8, wherein the upper and lower portions sandwich said electrical cable to provide strain relief for the waterproof seal.

16. A method for providing a waterproof seal for electrical assemblies comprising an electrical cable having a first and a second conductor each surrounded by a first and a second insulation respectively, the method comprising the steps of:

stripping away the insulation of the first conductor at a first location along a longitudinal length of the first conductor to form a first window of exposed electrical conductor;

stripping away the insulation of the second conductor at a second location along a longitudinal length of the second conductor to form a second window of exposed electrical conductor;

applying a bonding agent to an inside surface of a covering;

positioning a covering around the first and second windows; and applying an epoxy material to fill in space between the covering and the first and second exposed electrical conductors;

wherein the bonding agent causes the epoxy to bond to the inside surface of the covering and the epoxy material prevents moisture from passing through the first and second windows.

17. The method according to claim 16, further comprising the step of positioning a spacer between the first and second conductors to maintain a distance between the first and second conductors.

18. The method according to claim 17, further comprising the steps of:

forming the spacer in the shape of a disc; and positioning radial cutouts on the spacer adapted to receive the first and second conductors.

19. The method according to claim 17, further comprising the step of forming an opening in the spacer that extends through the spacer.

* * * * *